Jan. 7, 1936. W. S. KLAY ET AL 2,026,639
WORK CHUCK
Filed July 10, 1934 2 Sheets-Sheet 1
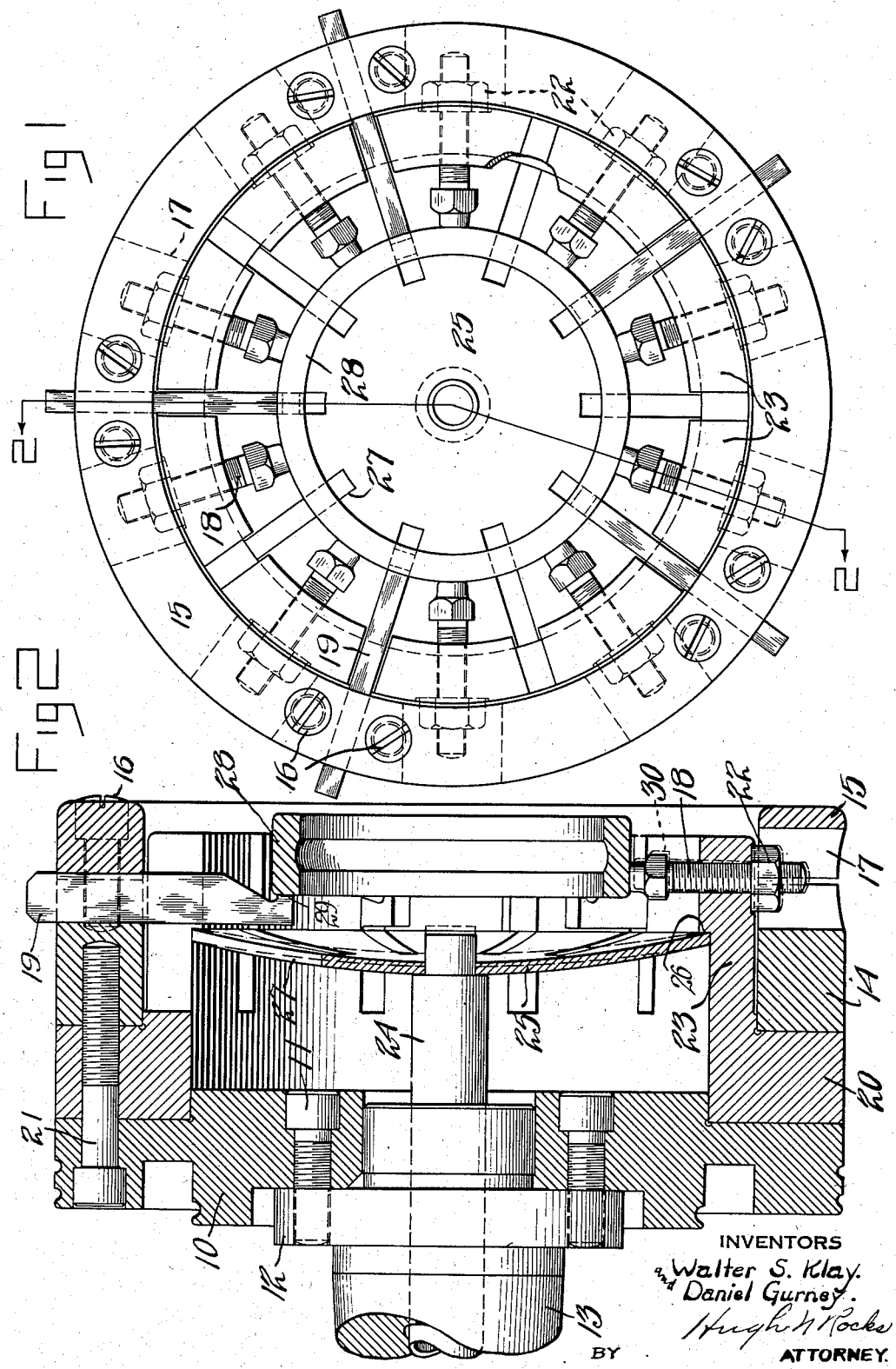
INVENTORS
Walter S. Klay.
and Daniel Gurney.
BY Hugh N Rocks
ATTORNEY.

Jan. 7, 1936.  W. S. KLAY ET AL  2,026,639
WORK CHUCK
Filed July 10, 1934  2 Sheets-Sheet 2
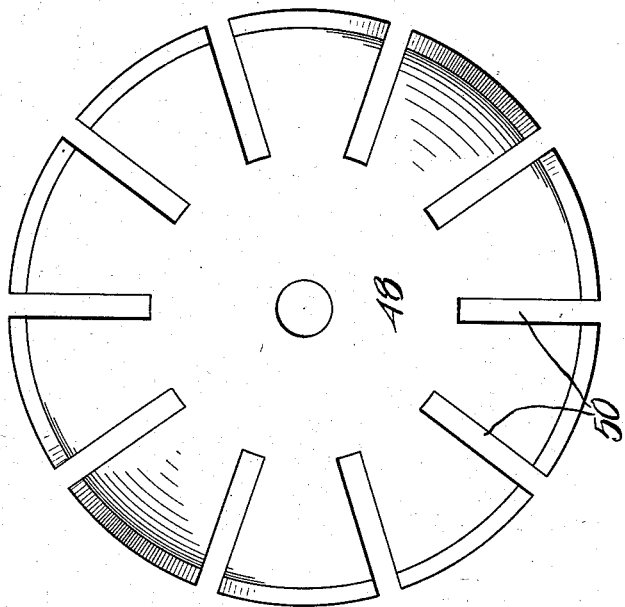
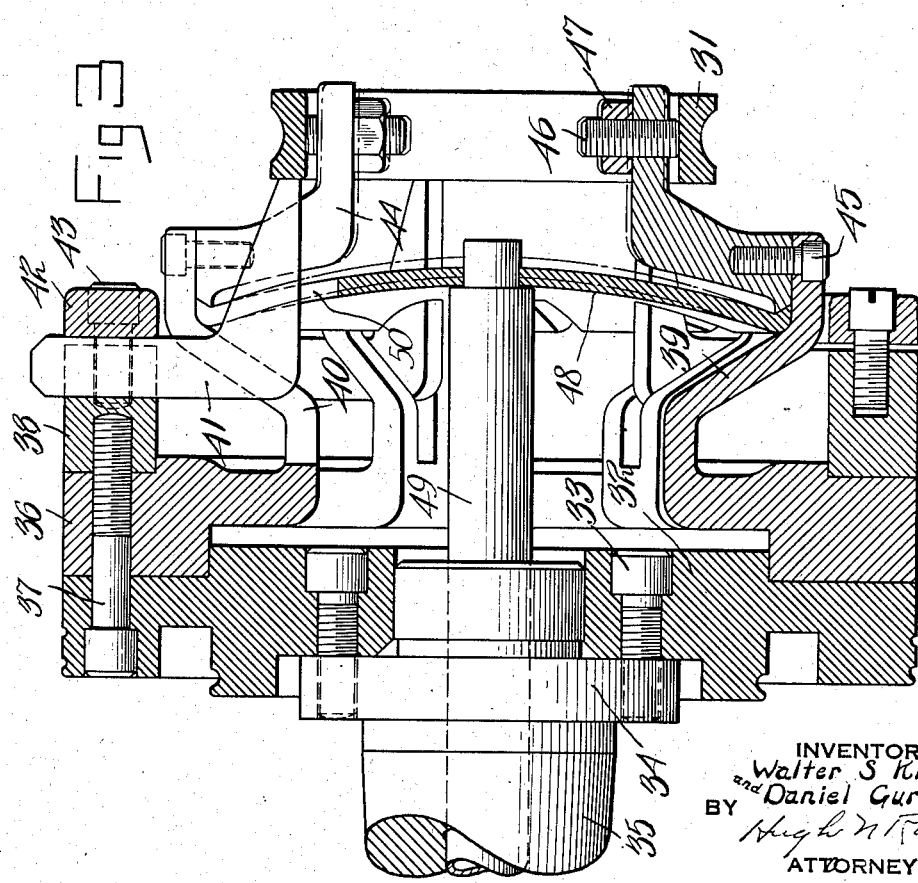
INVENTORS
Walter S. Klay
and Daniel Gurney
BY
Hugh N Rocks
ATTORNEY Patented Jan. 7, 1936

2,026,639

UNITED STATES PATENT OFFICE 2,026,639

WORK CHUCK

Walter S. Klay and Daniel Gurney, Waynesboro, Pa., assignors to Landis Tool Company, Waynesboro, Pa., a corporation of Pennsylvania Application July 10, 1934, Serial No. 734,545

5 Claims. (Cl. 279—41)

This invention relates to automatic work chucks and its object is to provide a chuck which is simple in construction and operation.

A further object is to provide a chuck that is radially adjustable to receive work of various sizes.

Referring to the accompanying drawings which are made a part hereof and on which similar reference characters indicate similar parts, Figure 1 is a face view of the chuck, Figure 2, a section on line 2—2 of Figure 1, Figure 3 is a section similar to Figure 2 showing a modified form adapted to grip internal surfaces of a work piece, and Figure 4 is a face view of a flexible operating disk used with the modified form shown in Figure 3.

In the drawings numeral 10 indicates a plate which may be secured by bolts 11 to a flange portion 12 of a rotatable work spindle 13. A pair of rings 14 and 15 are secured together by bolts or screws 16. These rings clamp a series of stop or locating bars 19 and hold them in position. The bars may be adjusted radially by loosening the bolts 16. The rings have mating openings 17 which receive the ends of pins 18. The rings 14 and 15, together with a ring 20 are held to the plate 10 by means of bolts 21. The ring 20 has a portion of smaller outside diameter which fits within the rings 14 and 15. This portion is cut up into a plurality of short projections. Through each of these projections extends one of the bolts 18. These bolts are locked in position on the projections by nuts 22. The blocks 19 are positioned between the ends of the projecting portions 23 so that radial movement of these projecting portions will not in any way affect the blocks 19. An operating plunger 24 is slidably mounted in the work spindle 13 and carries on its inner end a flexible disk 25, the diameter of which is somewhat greater than the inner diameter of the ring 20. The inwardly extending portions 23 of the ring 20 have shoulder portions 26 against which the periphery of the disk 25 rests. The disk 25 has a number of slots 27 cut radially inwardly to permit better flexing of the disk. The work 28 is held in position by means of the pins 18 and is located axially by the stop bars 19. The surface 29 of the stop bars determine the actual axial position of the work within the chuck. The projecting portions 23 of the ring 20 are resilient, with the work in the position shown in Figure 2, the work is held tightly griuped in the chuck.

In order to release the work the plunger 24 is moved to the right as shown in Figure 2 to bend the disk 25 to the dotted line position. This movement of the disk forces the projecting portions 23 radially outwardly and this releases the work by moving the pins 18 outwardly, the pins assuming the dotted line position shown at 30 in Figure 2. It is necesary to move the pins 18 outwardly only sufficient to release the tension on the work at which time the work may be readily removed from the chuck and other work positioned in place. When the new work has been positioned in place and located by the stop bar 19 the plunger 24 will be moved to the left at which time the projecting portions 23 will spring radially inwardly to bring the pins 18 into engagement with the periphery of the work to hold the work in place.

In Figures 3 and 4 is shown an adaptation of the device for gripping the internal surfaces of the work, the specific type of work shown being the inside race for ball bearings 31. A plate 32 is secured by bolts 33 to a flange portion 34 of the spindle 35. A ring or flange portion 36 is secured by bolts 37 between the plate 32 and a ring 38. The ring 36 has a forwardly extending cup portion 39 which is slotted at 40. Work locating stops 41 are secured to ring 38 by a face ring 42 and bolts 43. These stops extend through the slots 40 and are engaged by the side of the work to locate the work in correct axial position. The stops may be adjusted radially to adapt them for use with work of different diameters. Work fingers 44 are secured by bolts 45 to the interior of the forwardly extending portion 39. Bolts 46 are threaded through the outer ends of the fingers 44 and are locked in correct adjusted position by lock nuts 47. These bolts engage the interior of the work. A flexible disk 48 is positioned within the forwardly extending portion 39 and partially secured in position by the inner ends of the fingers 44. An operating plunger 49 extends axially through the spindle and has its end seating in a perforation in the disk 48. The disk 48 is normally under tension to hold the fingers radially outward to hold the bolts 46 in engagement with the interior of the work. To release the work the plunger 49 is moved forward to flex the disk to the dotted line position shown in Figure 3. This moves the fingers radially inwardly to the dotted line position to release the work. The disk 48 is slotted at 50 about its edge and the stop bars 41 extend forwardly through these slots. The slots also permit the disk to flex more readily than would be possible without them.

It will be obvious to those skilled in the art that various changes may be made in our device without departing from the spirit of the invention and therefore we do not limit ourselves to what is shown in the drawings and described in the specification, but only as indicated by the appended claims.

Having thus fully described our said invention, what we claim as new and desire to secure by Letters Patent, is:

1. A work chuck comprising a plate adapted to be secured to a work spindle, a ring secured to said plate, said ring having a plurality of spaced forwardly extending prongs each of said prongs having a work engaging pin extending radially inwardly and adapted to engage the periphery of the work, a disk positioned within said ring, a plunger for operating said disk, said disk having a diameter slightly greater than the inner diameter of the said ring and a pair of rings secured to the face of said first-named ring, said pair of rings having stop bars secured between them, said bars extending into the chuck and serving as means for positioning the work axially in the chuck.

2. A work chuck comprising a plate adapted to be secured to a work spindle, a ring removably secured to said plate, a pair of rings removably secured together and secured to the first named ring, said first-named ring having a plurality of projecting prongs each of which carries a radially extending pin adapted to engage the periphery of the work, a shoulder on the inner edge of each of said projecting portions of the said first named ring, a disk having radial slots in its periphery positioned within said first named ring and having its periphery engaging the ring adjacent said shoulder portions and an operating plunger engaging said disk, and extending through said work spindle for operating said disk to release and to cause engagement of the work holding pins with the periphery of the work.

3. A chuck comprising a face plate, a circular series of gripping members secured to said plate and adapted to grip and hold a work piece by their own resilience, a flexible concave-convex disk mounted within said circular series with its periphery engaging said gripping members and means engaging the convex side thereof to expand said disk and cause said gripping members to withdraw and release said work piece.

4. A chuck comprising a face plate, a circular series of resilient members secured to said face plate, said members being normally operable to engage and grip a work piece of their own resilience, means to actuate said members radially and simultaneously comprising a flexible disc mounted within the circle formed by said members and in peripheral engagement therewith and means to flex said disc.

5. A chuck comprising a face plate, a circular series of resilient members secured to said face plate, said members being normally operable to grip a work piece, a flexible disc mounted within said circular series and secured to the members thereof, said disc normally supplementing the resilience of said fingers and means to contract said disc and draw said fingers radially inward to release said work piece.

WALTER S. KLAY.
DANIEL GURNEY.